United States Patent
Stempin et al.

(10) Patent No.: US 9,590,434 B2
(45) Date of Patent: Mar. 7, 2017

(54) COMPACT AND MODULAR ELECTRICAL POWER SUPPLY UNIT, WITH MULTI-CONVERTERS, NOTABLY FOR FAST RECHARGING TERMINALS FOR ELECTRIC VEHICLES

(71) Applicant: EVTRONIC, Pessac (FR)

(72) Inventors: Eric Stempin, Pessac (FR); Romain Duponcheel, Saint Morillon (FR)

(73) Assignee: EVTRONIC, Leognan (FR)

( * ) Notice: Subject to any disclaimer, the term of this patent is extended or adjusted under 35 U.S.C. 154(b) by 242 days.

(21) Appl. No.: 14/578,834

(22) Filed: Dec. 22, 2014

(65) Prior Publication Data

US 2015/0180252 A1 Jun. 25, 2015

(30) Foreign Application Priority Data

Dec. 23, 2013 (FR) .................................... 13 63399

(51) Int. Cl.
| | | |
|---|---|---|
| H02J 7/00 | (2006.01) | |
| H02J 3/00 | (2006.01) | |
| H02J 3/32 | (2006.01) | |
| B60L 11/18 | (2006.01) | |
| H02M 7/219 | (2006.01) | |

(Continued)

(52) U.S. Cl.
CPC ............ *H02J 7/0042* (2013.01); *B60L 11/18* (2013.01); *H02J 7/0068* (2013.01); *H02J 7/022* (2013.01); *H02M 7/219* (2013.01); *H02J 1/10* (2013.01); *Y02T 90/127* (2013.01)

(58) Field of Classification Search
CPC .................................................. H02J 7/0042
USPC ......... 320/103, 109, 138; 307/43, 45, 46, 48; 180/65.1, 65.21, 65.29
See application file for complete search history.

(56) References Cited

U.S. PATENT DOCUMENTS

| | | | | |
|---|---|---|---|---|
| 7,141,893 B2* | 11/2006 | Hanahan | ................... | H02J 1/10 307/64 |
| 7,385,372 B2* | 6/2008 | Ahmad | ................... | B60L 1/003 180/165 |

(Continued)

FOREIGN PATENT DOCUMENTS

FR 2 990 310 11/2013

OTHER PUBLICATIONS

French Search Report dated Oct. 8, 2014, corresponding to the French Priority Application No. 1363399.

*Primary Examiner* — Richard V Muralidar
(74) *Attorney, Agent, or Firm* — Young & Thompson

(57) ABSTRACT

The device includes a set of electronic switches having a common structure and forming modules for converting electrical energy and a power DC bus onto which the modules are connected in parallel. These modules are controlled by a control circuit so as to supply electrical energy originating from external sources of energy over the power DC bus or to extract electrical energy over this bus to recharge batteries. The device includes at least one AC-DC conversion module configured for carrying out the rectification of an AC line supply and for powering the DC bus, a DC-DC conversion module configured for charging a user battery from the DC bus and a DC-DC conversion module configured for alternatively allowing the recharging of a storage battery from the DC bus or the discharge of the same battery over the latter. The various modules are mounted onto an accommodation structure forming a heat dissipator.

14 Claims, 4 Drawing Sheets

(51) Int. Cl.
*H02J 7/02* (2016.01)
*H02J 1/10* (2006.01)

(56) References Cited

U.S. PATENT DOCUMENTS

| | | | | |
|---|---|---|---|---|
| 7,847,432 B2* | 12/2010 | Ichikawa | ............ | B60L 11/1851 |
| | | | | 307/45 |
| 8,363,388 B2* | 1/2013 | Wise | .......................... | H02J 1/08 |
| | | | | 361/622 |
| 2014/0266013 A1* | 9/2014 | Becker | .................... | H02J 7/007 |
| | | | | 320/107 |

* cited by examiner

COMPACT AND MODULAR ELECTRICAL POWER SUPPLY UNIT, WITH MULTI-CONVERTERS, NOTABLY FOR FAST RECHARGING TERMINALS FOR ELECTRIC VEHICLES

FIELD OF THE INVENTION

The invention relates to the general field of systems for conversion and for storage of electrical energy. It relates, more particularly, to terminals for the fast recharge of batteries of electric vehicles or, more generally, to the equipment performing the fast charging of high power batteries notably using AC current from the line supply.

CONTEXT OF THE INVENTION

Prior Art

In the field of the charging of high power batteries using the line supply current, batteries such as those equipping electric vehicles for example, particular attention is generally paid to the electrical power demand from the line supply. This is especially the case for the equipment integrated into terminals for recharging electric vehicles disposed in public places, for which, owing to their location, the line supply normally available is a supply limited in power.

Owing to this limitation, it is necessary to install means allowing the best possible efficiency to be obtained relating to the use of the electrical power supplied by the line current.

Furthermore, because of this limitation, it is sometimes impossible to carry out a fast charging of the batteries of an electric vehicle using only the line supply current for the whole duration of the charging process. It is for this reason that the fast charging terminals can incorporate supplementary devices for the supply of electrical energy which will, during certain phases of the charging process, complement the electrical energy demand from the line supply in such a manner as to limit the power consumed to a value lower than the maximum power available from the line supply. These supplementary devices are for example formed by buffer batteries, kinetic accumulators, photovoltaic generators, or any other source of electrical energy.

The use of supplementary devices for supplying electrical energy is generally accompanied by the installation in the terminal of complementary equipment allowing the summing of the current supplied by the supplementary devices and of that drawn from the line supply to be performed so as to supply the battery under charge with the desired charging current. Furthermore, in the case where the supplementary device for supplying electrical energy is a buffer battery or reversible energy sources, the charging terminal has to include the equipment necessary for the periodic recharging of the buffer battery or of the reversible energy sources.

As a result, the installation of all this equipment in a charging terminal, in other words within an installation of relatively limited size, together with the interconnection cabling connecting these units of equipment together, constitute a difficult operation to implement owing to the installation constraints specific to each unit of equipment and logistics constraints which impose that at least some of the units of equipment be easily accessible for maintenance.

In the field of terminals for recharging of electric vehicles in particular, there consequently exists a pressing need to dispose of equipment which is at the same time highly efficient, as compact and as modular as possible and easily interconnected.

In order to recharge electrical batteries, notably in the context of fast recharging terminals for vehicles, AC-DC conversion devices, comprising a diode or thyristor rectifier associated with a converter of the Buck type, are widely employed.

One drawback of this type of structure is that it is susceptible to generating harmonics on the electrical system from which the energy is tapped, the line supply for example.

Another drawback consists of the necessity for installing a smoothing choke on the rectifier output. Such a known structure is therefore very bulky.

Yet another drawback is that it is likely to degrade the power factor of the installation by inducing a phase-shift on the consumed current, this phase-shift being notably induced by the use of diode or thyristor rectifiers.

As a consequence, the use of such structures involves the installation of means for filtering harmonics and for raising the power factor, which means are costly and bulky and whose inclusion is detrimental from a technical and cost perspective for the final product.

In this same field, the French patent application filed by the company Schneider Electric Industries and published under the reference number FR 2990310 discloses a device for conversion of electrical energy designed for recharging the batteries of an electric vehicle from an AC line supply, single or three-phase for example, which comprises a first module providing the functions for rectification and filtering of the line voltage used and a second DC-DC conversion module providing the adaptation of the DC voltage produced by the first module to the voltage of the batteries to be recharged. However, this application does not disclose any means for providing a supply of energy complementary to that delivered by the line supply in order to ensure an adequate charging of the batteries in certain phases of the charging process during which the power available from the line supply proves to be insufficient.

Furthermore, the structure itself of the device claimed does not allow the value of the voltage at the output of the rectifier to be adjusted dynamically, without carrying out modifications, which does not allow the said device to be automatically adapted to any potential fluctuations over time of the line voltage or to potential variations, from one vehicle to the other, in the voltage of the batteries to be charged.

Furthermore, such a structure which comprises both a module for rectification and for filtering of the line voltage, together with a DC-DC conversion module, exhibits by its nature an absence of modularity which renders an implementation in a compact and modular form difficult.

INTRODUCTION TO THE INVENTION

One aim of the invention is to provide a modular structure for a converter of electrical energy allowing one or more groups (or packs) of batteries, referred to as user batteries, to be recharged in an optimal manner by combining the electrical energy supplied by various sources with the electrical energy provided by an AC line supply, in such a manner as to optimize the electrical consumption on the said line supply, notably as a function of the maximum power available from the supply.

For this purpose, the subject of the invention is a modular device for the conversion of electrical energy for implementing the recharging of an electrical battery, or user battery, using an AC line supply and additional sources of electrical energy. The device according to the invention mainly comprises:

- a plurality of switching modules, with a substantially identical structure, each switching module being associated with one of the sources of electrical energy available and producing, by chopping the voltage delivered by the source with which it is associated, a DC voltage of given value;
- a DC voltage bus, or power DC bus, comprising two electrical lines, to which each of the various sources of electrical energy available is connected by means of the switching module associated with it, each switching module being composed of two electronic switches configured in series between the two lines of the power DC bus,
- a control circuit which generates the chopping controls applied to the switches of the various switching modules, the chopping control applied to a given switching module being defined by a control law which depends on the voltage and on the charging current needed to implement a recharging of the electrical battery considered and on the maximum power available from the AC line supply;
- an accommodation structure configured for receiving the various switching modules and for forming the power DC bus, said accommodation structure comprising a plurality of functionally identical locations onto which the various switching modules may be placed and connected to the power DC bus.

According to one technical feature of the device, the chopping controls generated by the control circuit are square-wave signals having a duty cycle that varies as a function of the value of the voltage to be established on the power DC bus.

According to one particular embodiment in which the AC line supply is a three-phase supply, the device according to the invention comprises three switching modules each performing the rectification of the AC voltage delivered by one of the phases; the mid-point of each of the three switching modules being connected to one phase of the AC supply via a transformer.

According to one technical feature, the device comprises a switching module configured for implementing the connection to the power DC bus of an electrical energy storage battery of a given voltage, the connection being implemented in such a manner that the storage battery can be charged by the power DC bus or else discharged into the latter.

According to another technical feature, the device comprises a switching module configured for implementing the connection of a user battery of given voltage to the power DC bus, in such a manner that said user battery can be charged by the power DC bus with a given voltage and charging current characteristic of the battery used.

According to another technical feature, this switching module is furthermore configured in such a manner that said user battery can be discharged onto the power DC bus so as to supply a top-up electrical energy over this bus.

According to another technical feature, the device comprises an accommodation structure which houses a set of switching modules with identical structures. These modules are mounted onto the accommodation structure so as to form at least three stages for conversion of electrical energy:

- a reversible AC-DC converter stage comprising three switches connected to the AC line supply via an isolation transformer,
- a first bidirectional DC-DC conversion stage configured for implementing the recharging of an electrical storage battery;
- a second bidirectional DC-DC conversion stage configured for implementing the recharging of the user battery to be recharger.

The first DC-DC conversion stage is furthermore configured in such a manner as to be able to inject current taken from the storage battery onto the power DC bus.

According to another technical feature of the device, the control circuit carries out the regulation of the charging or discharge current of the storage battery, the regulation of the charging current of the user battery as well as with the regulation of the power consumed over the AC line supply. This regulation is carried out by measuring the charging currents of the storage battery and of the user battery and also the current consumed over the AC line supply and by applying to each of the AC-DC or DC-DC conversion modules a chopping signal whose duty cycle varies as a function of the current measurement performed for the module in question.

According to another technical feature of the device, the chopping signal applied by the control circuit to each of the modules depends on setpoint values relating to the voltage and to the charging current of the user battery, to the value of the voltage of the power DC bus and to the maximum power available from the line supply.

According to another technical feature of the device, the accommodation structure comprises a support onto which the housings enclosing the various switching modules forming the device are mounted, the support itself forming a heat dissipation element, and a conductor device forming the power DC bus, which connects in parallel the various switching modules mounted onto the accommodation structure, each of the links of the power DC bus being connected to each of the switching modules by a suitable connection means.

According to another technical feature of the device, the switching modules are configured in such a manner that, when they are mounted onto the accommodation structure, their connection points with the two links forming the power DC bus are aligned in two parallel rows. The power DC bus is then composed of two conducting plates separated by an insulator, each plate having connection areas arranged so as to be disposed facing the points in such a manner as to be able to be connected to the latter by suitable fixing means.

According to one particular embodiment of the device, the power DC bus is formed by two layers of conducting material placed on the opposite faces of a plane layer of electrically insulating material forming a sandwich structure.

DESCRIPTION OF THE FIGURES

The features and advantages of the invention will be better appreciated thanks to the description that follows, which description relies on the appended figures that show.

DETAILED DESCRIPTION

The subject of this patent consists of a compact solution for conversion of electrical energy allowing an AC electrical supply comprising one phase or more and one or more elements for storage of electrical energy, or else for production of electrical energy, to be connected to an electrical battery which has to be recharged, the battery of an electrically-powered vehicle, also referred to as EV in the following part of the text.

The text that follows describes the principle of the invention through one exemplary embodiment presented here as non-limiting the scope of the invention.

The device presented allows a three-phase AC line supply, together with a supplementary electrical energy supply element, to be connected to a user battery intended for supplying energy to an electric vehicle, also referred to as EV battery in the following part of the user text. In the case of the example described here, the supplementary electrical energy supply element consists of a storage battery or buffer battery.

Figure 1:
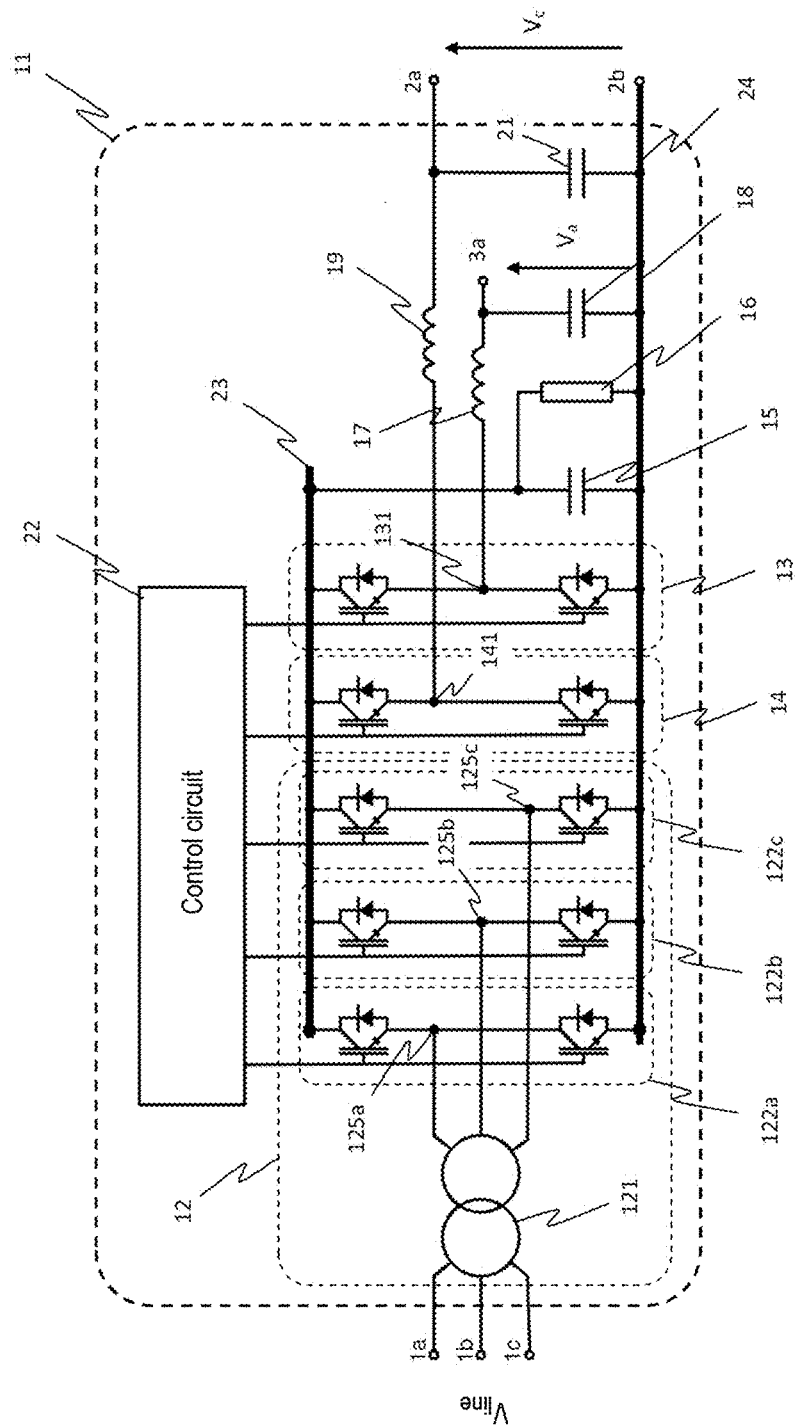
FIG. 1, an overall schematic diagram illustrating the structure of the device for conversion of electrical energy according to the invention.

As illustrated by FIG. 1, the present device according to the invention consists of an accommodation structure 11 which houses a set of electrical energy converters, with identical structures, mounted onto the accommodation structure so as to form at least three conversion stages 12, 13 and 14:
- a reversible converter stage (i.e. AC-DC and DC-AC) 12 with a galvanic isolation connecting an AC electrical supply to the device, at 1a, 1b and 1c,
- a bidirectional DC-DC conversion stage 13, connected at 3a and 2b to an element for storage of electrical energy (not shown in the figure) and
- a bidirectional DC-DC conversion stage 14, connected at 2a and 2b to the user battery to be recharged, the EV battery in the present example.

The first reversible AC-DC conversion stage 12 is a chopping circuit which can convert the AC voltage from the electrical supply, the line voltage, into a DC voltage or vice versa. For this purpose, it comprises a transformer 121 which provides a galvanic isolation as well as the filtering of the AC current.

It also comprises power electronic switches 122 each composed of two switches configured in series, MOSFET or IGBT (Insulated Gate Bipolar Transistor) transistors incorporating a diode in anti-parallel configuration or a flyback diode for example.

According to the invention, the device has one switch per phase of the AC supply used, three switches 122a, 122b and 122c for example in the case of a three-phase AC supply such as that illustrated in FIG. 1.

The primary circuit of the transformer 121 is connected to the phases of the line supply AC, the windings of the secondary circuit, for their part, being respectively connected to the mid-points of the switches responsible for performing the rectification of the AC voltage provided by the AC supply, the points 123a, 123b and 123c in the example in FIG. 1.

The transformer 121 is furthermore designed to withstand the input line voltage (of around 400V r.m.s.) and to be capable of transmitting the maximum power available from the AC supply, a power of the order of 50 kW for the three-phase line supply for example. The switches 122 have, for their part, dimensions that depend on the maximum current flow into the user battery to be recharged, during the charging process of the latter.

The first stage 12 is furthermore associated with one or more high-voltage capacitors 15 with a high capacitance (of around 220 μF for example), connected between the positive and negative terminals of the switches 122, which are used for filtering the rectified AC voltage. Each capacitor 15 is itself loaded by a resistive element 16 placed in parallel across its terminals which allows the latter to be stabilized and to be discharged when the operation of the device 11 is shut down.

Owing to its structure which incorporates an isolation transformer 121, the AC-DC conversion module advantageously allows inductive filtering elements at the input and at the output of the module to be obviated, without any impact on the shape of the input AC voltage, and thus a gain in compactness.

Moreover, by virtue of the presence of the transformer 121, it also allows a galvanic isolation between the input and the output of the module.

The second DC-DC conversion stage 13 is also a chopping circuit which converts the AC voltage rectified by the module 12 and stored in the capacitor 15 into a DC voltage of lower value corresponding for example to the operating voltage of the storage battery, or conversely which converts the voltage from the storage battery into a higher DC voltage corresponding to the voltage of the power bus.

For this purpose, it also comprises an electronic switching unit composed of two power electronic switches configured in series, MOSFET or IGBT transistors incorporating a diode in anti-parallel configuration or flywheel diode for example.

The second stage 13 is furthermore associated with a smoothing coil 17 which connects the mid-point 131 of the switch to the point 3a for connection of the element for storage of electrical energy and which is used for filtering the DC current delivered by the module, and also with a capacitor 18 connected between the points 3a and 2b designed to filter the DC voltage at the output of the second stage 13.

The value of the inductance here is a function of the chopping frequency at which the power switches chop the DC bus voltage and of the desired ripple current. With regard to the capacitor, this is chosen in order to form a low-pass filter whose cut-off frequency is substantially lower than the chopping frequency.

The third DC-DC conversion stage 14 is also a chopping circuit which converts the DC voltage delivered by the two firsts stages into a DC voltage of lower value used for implementing the recharging of the user battery, the EV battery in the example presented here, or conversely which converts the voltage from the user battery into a higher DC voltage corresponding to the voltage of the power bus.

For this purpose, it also comprises an electronic switching unit composed of two power electronic switches configured in series, MOSFET or IGBT transistors incorporating a diode in anti-parallel configuration or flyback diode for example.

The third stage 14 is furthermore connected to a smoothing coil 19 which connects the mid-point 141 of the switch to the point 2a for connection of the user battery to be charged and which is used for filtering the DC current, and also to a capacitor 21 connected between the points 3a and 2b for filtering the DC voltage at the output of the third stage 14.

As for the second stage 13, the value of the inductance is a function of the frequency at which the power switches chop the DC bus voltage and of the desired ripple current. With regard to the capacitor, this is chosen in order to form a low-pass filter whose cut-off frequency is substantially lower than the chopping frequency.

According to the invention, all the switching units forming the various stages of the device have the same bidirectional structure and are composed of electronic switches of the same type, such that they are interchangeable, which allows a system that is advantageously modular in terms of its constituent elements to be obtained.

The size of each switch depends on the equipment to which it belongs. Thus, for example, in the case of a charging terminal with a power of 50 kW designed for the recharging of batteries of 400V with a current of 125 A, each switch is composed of a fast semiconductor component, withstanding high voltages of around 1200V and high currents of around 125 A, a MOSFET or IGBT transistor for example, components which can furthermore handle opening and closing switching frequencies of the order of a few tens of kilohertz.

Also according to the invention, the switching circuits 122a, 122b and 122c of the first AC-DC conversion stage 12 are mounted directly on the output of the secondary winding of the transformer 121, the smoothing of the input current being carried out by the inductive nature of the winding forming the secondary circuit of the transformer, and also by the high chopping frequency (a few tens of kilohertz) applied to the AC input voltage.

Thus, it is advantageously possible to perform the chopping without introducing any smoothing coil, which allows the compact nature of the device to be reinforced.

In order to carry out a coherent control of the various stages, the device according to the invention comprises a control circuit 22 whose main role is to control each of the power electronic switches according to a suitable control law.

The control circuit 22 is for example an electronic circuit which generates the control signals for the power electronic switches, transistors in the present example, which operate in a switched mode between a non-conducting state and a conducting state.

The two transistors forming the same switch are controlled in a complementary manner, one transistor being in the OFF state when the transistor with which it is associated is in the ON state.

Furthermore, the variation of the electrical power delivered by each stage is controlled by varying the duty cycle of the control signal applied to the switches (ratio between the conduction time and the non-conduction time of a switch). The control signal allows the current in each branch of the electrical converter to be controlled and an efficient configuration in parallel of the various sources of electrical energy used at a given time for recharging the battery efficiently.

From an architectural point of view, the device according to the invention is organized in such a manner as to reinforce the functionally modular nature.

For this purpose, the switching modules that constitute the various stages, the modules 122a, 122b, 122c, 13 or 14 in the present example, have an identical hardware structure which allows their assembly by simple connection in parallel, in such a manner that this assembly may be implemented without it being necessary to impose an order of installation for the various stages.

Figure 2:
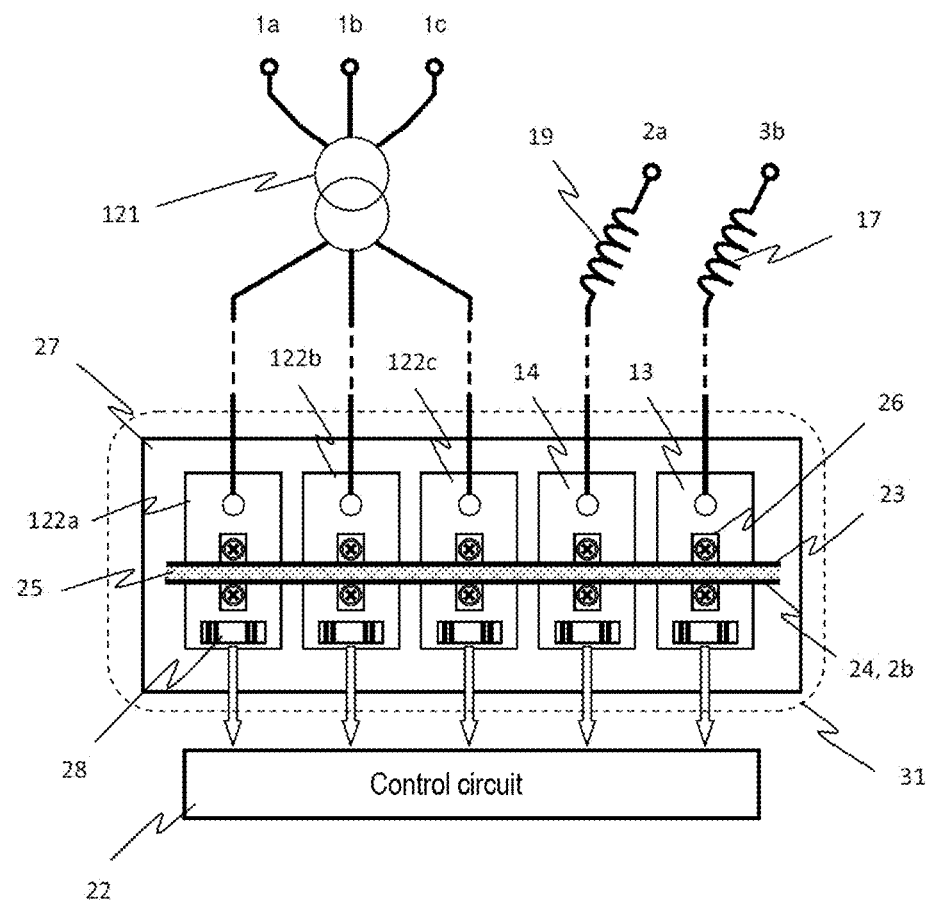
FIG. 2, a schematic representation of the accommodation structure of the device according to the invention.
Figure 3:
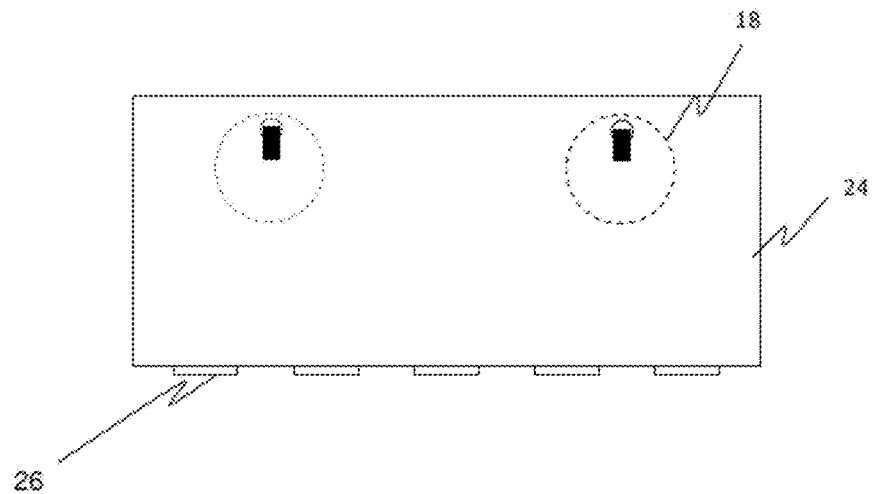
FIG. 3, a schematic side view of one embodiment of the power DC bus installed on the accommodation structure of the device according to the invention.
Figure 4:
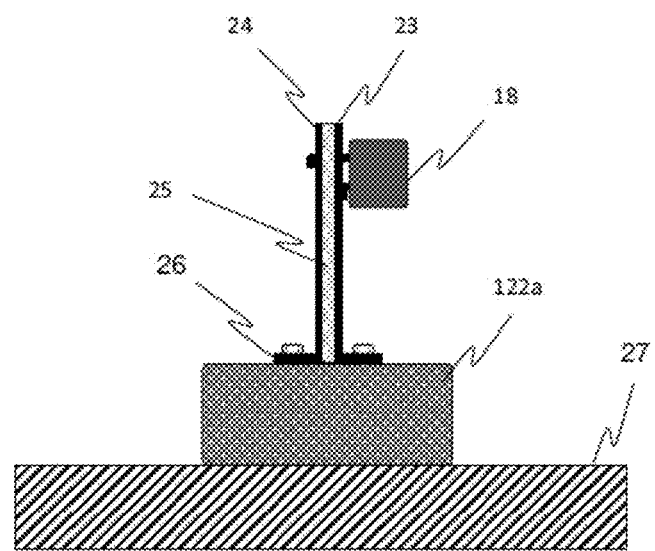
FIG. 4, a schematic front view of the power DC bus installed on the accommodation structure of the device according to the invention in the embodiment of FIG. 3.

The architecture of the device is accordingly organized around a central structure 31, or accommodation structure, such as that illustrated by FIGS. 2 to 4 for example. This structure plays the role of physical accommodation structure onto which the various modules are mechanically mounted and of interconnection structure in the form of a power bus 23-24.

In the embodiment illustrated by FIGS. 2 to 4, the power bus itself is formed by two layers of conducting material respectively forming the links 23 and 24 of the bus, such as illustrated in FIG. 1. These layers of conducting material are separated from one another by a layer of insulating material 25 onto which the two layers of conducting material are assembled like a sandwich.

In one preferred embodiment, the two layers of conducting material forming the links 23 and 24 are two metal plates fixed, by adhesive bonding for example, onto each of the faces of a plate 25 of insulating material. Alternatively, the power bus may be formed by a layer of an insulating substrate on the faces of which two layers of conducting material are chemically deposited.

The power bus thus formed comprises fixing pads 26, configured and arranged in such a manner as to be able to be fixed to the corresponding terminals of the housing enclosing an electrical conversion module, in other words a switching unit, 122a, 122b, 122c, 13 or 14.

On the conducting plates 23 and 24, it also comprises fixtures allowing the direct mounting onto the power bus of capacitors designed to filter the rectified AC voltage produced by the first stage 12, such as the capacitor 15 previously described.

Aside from the power bus, the accommodation structure also comprises, as FIGS. 2 and 4 illustrate, a bulk heat dissipating element 27 forming a radiator onto which the housings enclosing the various switching units are fixed in a suitable manner such that the heat produced by the latter is efficiently dissipated by means of the radiator 27.

Depending on the requirements and the chosen configuration, the heat dissipating element 27 may be a radiator of the convector type with fins or else a radiator with a circulating fluid.

According to the invention, each switching module 122a, 122b, 122c, 13 or 14 comprises its own inputs/outputs allowing the necessary connections to be made with the various elements of the device in accordance with the diagram in FIG. 1, namely:

the connection of the switching inputs 122a, 122b and 122c forming the AC-DC conversion stage 12 to the isolation transformer 121 of the AC supply, or the connection of the outputs of the switching modules 13 and 14 forming the DC-DC conversion stages 13 and 14 to the filtering chokes 17 and 19 for output currents;

the connection of each module to the links 23 and 24 of the power bus;

the connection of each module to the control circuit 22 via a suitable interface (not shown in the figures).

In this way, an energy conversion module may advantageously be installed or removed without this modifying the configuration or the interconnection of the modules already mounted on the accommodation structure 31.

In this way also, each switching module may furthermore be advantageously positioned on any given location of the accommodation structure 31, the position occupied by a given switch being independent of its function in the device.

It is thus possible to place each of the various switching modules 122a, 122b, 122c, 13 or 14, irrespective of its operation, in such a manner, for example, as to optimize the distribution of the thermal heating over the heat dissipator 27.

Figure 5:
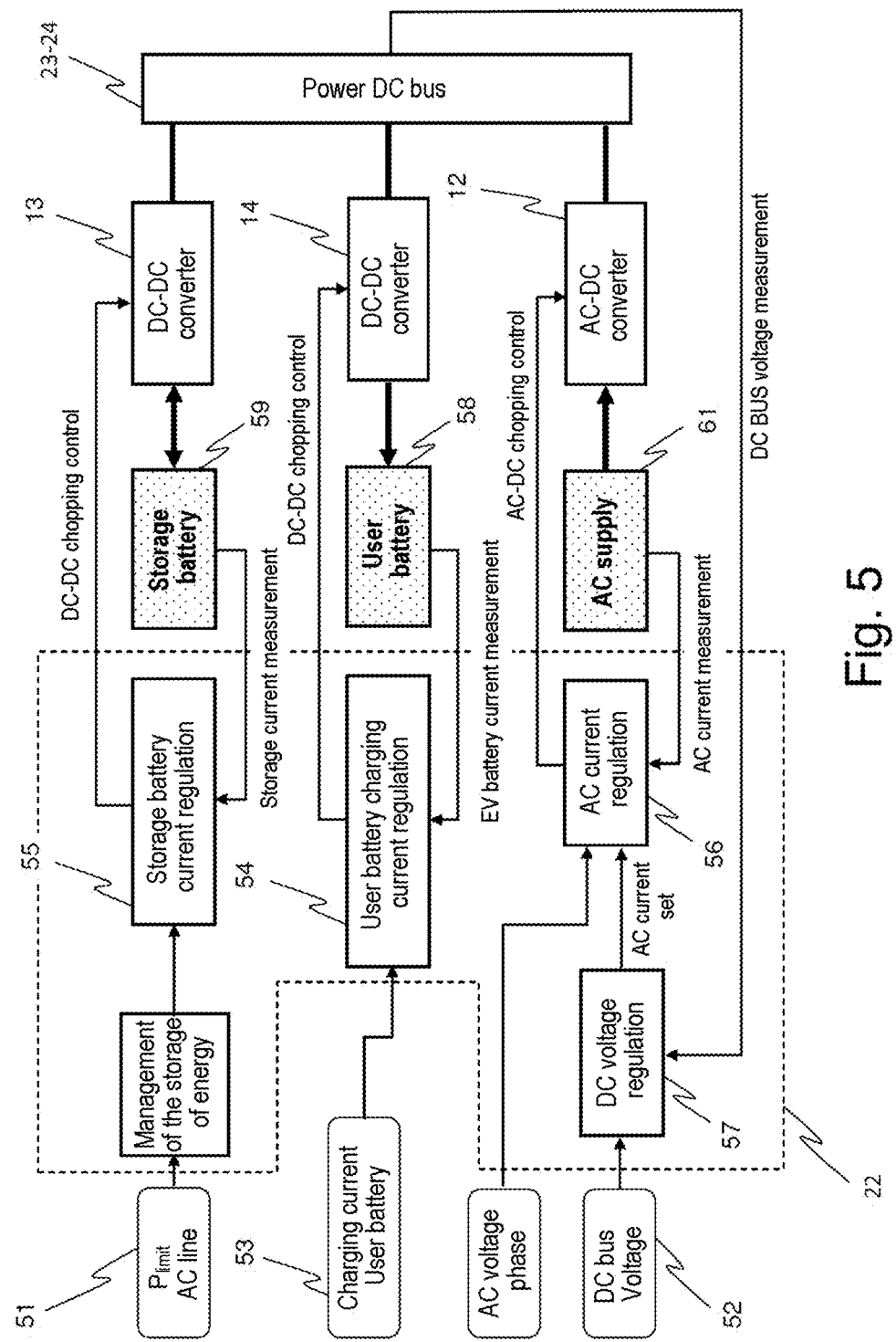
FIG. 5, a functional block diagram illustrating the principle of operation of the device according to the invention.

From a functional point of view, the device according to the invention performs and implements the functions shown in the illustration in FIG. 5. Accordingly, its operation may be described by the various following modes, which modes may be automatically sequenced by the control circuit 22 responsible for managing the operation of the equipment in question, here the recharging terminal, or implemented upon the request of the operator:

an initial mode of operation;
a start-up mode of operation;
a nominal mode of operation;
a high-consumption mode of operation;
a recovery mode of operation.

In the initial mode of operation, or 'stand-by' mode, no switch is operated by the control circuit 22 so that, since the switches of the various DC-DC modules are in the non-conducting state, the voltage of the AC supply is simply rectified and transmitted by the power DC bus to the capacitors 15 which are powered by the bus.

In the start-up mode of operation, the equipment, the recharging terminal in the present example, is powered up for the purpose of carrying out the recharging of a user battery.

The switch elements forming the switches 122a to 122c of the AC-DC conversion module 122 are controlled by the control circuit 22 according to a given control law, in such a manner as to charge up the bus capacitor 15 to a constant value and higher than the voltage of the batteries to be recharged. The device is then ready to charge the user battery.

The control law notably takes into account input setpoints such as, notably, the maximum power 51 that can be taken from the AC supply and the voltage 52 to be established on the power DC bus 23-24.

The nominal mode of operation corresponds to a mode of operation for which the charging of the user battery does not require any provision of energy complementary to that supplied by the line supply.

Thus, in the present exemplary embodiment (charging of a battery directly with DC current), the control circuit 22 then controls the switches of the DC-DC conversion module 14 of the device, according to a given control law, in such a manner as to establish a current of given value in the user battery during the charging process. This value of current is generally transmitted to the control circuit by an external setpoint 53 defined based on a charging profile specific to the technology of the battery in question, a current of around 125 Amps for example.

As illustrated in FIG. 5, the control circuit 22 performs a regulation 54 of the charging current of the user battery, by controlling at any time the value of this charging current and by acting on the value of the duty cycle of the signal controlling the switches of the DC-DC conversion module 14 in such a manner as to maintain the setpoint value.

In this mode of operation, as long as the power available from the AC supply permits it, the control circuit 22 also controls the switches of the DC-DC conversion module 13 of the device, according to a given control law, in such a manner as to ensure the charging of the storage battery with a regulation 55 of the charging current for the storage battery at the appropriate value.

The charging of the storage battery is operated according to a principle identical to that followed for the charging of the user battery, the value of the charging current not, however, being a setpoint but an internal parameter which depends on the power available from the AC supply and on the storage battery associated with the device according to the invention in the recharging terminal in question.

The power consumed on the AC supply is furthermore controlled by the control circuit 22 which performs the regulation 56, 57 of the AC current consumed by measuring the voltage and the current from the AC supply and by acting on the value of the duty cycle of the signal controlling the switches of the AC-DC conversion module 12.

The high-consumption mode of operation corresponds to a mode of operation for which, for certain phases of the charging of the user battery, the power that can be drawn from the AC supply does not allow the desired charging current to be obtained.

During a high-consumption operation, the energy compensation is then activated. The two switches of the DC-DC conversion module 13 associated with the storage battery are controlled according to a given control law, in such a manner as to establish a complementary current.

This complementary current can be a DC current that is added to the current produced by the AC-DC conversion module 12 from the AC supply, in the case where the user battery is recharged directly with DC current, as in the example previously described.

Alternatively, this may be an AC current produced by the AC-DC conversion module 12 from the energy stored in the buffer battery, which current is added to the AC current supplied by the line supply, in the case where the user battery is recharged from an AC source by a supplementary rectifier device, accommodated in the vehicle for example.

The activation of this mode of operation is engaged, during the charging of the user battery, by the measurements of the AC current delivered by the line supply, which measurements are carried out by the control module 22. These measurements are compared with the maximum level of power available from the AC supply, which maximum level is represented by the setpoint 51 transmitted to the control circuit 22.

Accordingly, if the current consumed on the AC supply reaches a maximum value, this mode of operation is activated and the conversion module 13 is controlled so as to produce a top-up current from the energy available in the storage battery.

The recovery mode of operation corresponds to a mode for which the control circuit 22 only performs the recharging of the storage battery by actuating the switches forming the DC-DC conversion module 14 associated with the latter, according to a principle analogous to that followed for the nominal mode of operation.

In view of the various modes of operation previously described, the control law of the AC-DC conversion module therefore consists in maintaining the DC voltage of the filtering capacitor 15 at a constant setpoint value by acting on the modulation of the power absorbed from the AC supply in such a manner that, if the voltage on the power DC bus decreases, then the power absorbed from the AC electrical supply is increased; and that if the voltage on the power DC bus increases, then the power absorbed from the AC electrical supply is reduced.

The power absorbed by the AC-DC conversion module 12 is thus modulated dynamically by measuring the current drawn from the AC electrical supply and by applying a control signal having the appropriate duty cycle to the switches forming the switching module 122a to 122c of the conversion module 12.

In all the cases of operation, the control circuit 22 ensures that the power consumed on the AC supply is lower than the imposed setpoint value 51 and, in the case where this power is insufficient for providing a suitable charging of the user battery (DC charge or AC charge), tries to supplement the deficit by engaging a contribution from the complementary sources of electrical energy of which it disposes, by for example using the energy contained in the storage battery.

According to the invention, the various modes of operation may be implemented according to various combinations which correspond to the operation executed.

Thus, in the case of an operation for recharging a user battery, the control circuit executes successively a phase of operation in startup mode and a phase in nominal mode inserting between these two phases, where necessary, a phase of operation in high-consumption mode.

Similarly, after the execution of a recharging operation, the control circuit may execute a phase of operation in recovery mode or go directly into stand-by mode.

It should be noted that, aside from the technical advantages that are highlighted in the preceding description, the control of the current from the AC electrical supply by the control circuit 22 advantageously allows, without the addition of any specific hardware, a correction of the power factor to be implemented by maintaining the current and the voltage from the AC electrical supply in phase.

It should also be noted that, by virtue of its topology, the conversion structure of the AC-DC conversion module 12 is a bidirectional structure; it is accordingly possible to use this module for transferring energy from the DC current storage elements to the AC circuit.

This intrinsic technical feature for example allows, without any additional hardware, an energy compensation to be implemented when a vehicle is being charged with three-phase AC current.

It should furthermore be noted that, owing to its modular structure, the device according to the invention can accommodate several sources of electrical energy allowing, where necessary, the AC line supply, which generally constitutes the main source of electrical energy, to be supplemented or even to be temporarily replaced. The device according to the invention can thus accommodate, aside from a storage battery, various sources for production of electrical energy such as photovoltaic generators or wind turbines.

The integration of these other sources into the general system is achieved by means of complementary conversion modules dedicated to these sources, installed on the accommodation structure 31. The size of the accommodation structure is then designed to have a sufficient number of connection points to the power DC bus 23-24.

The invention claimed is:

1. A modular device (11) for conversion of electrical energy for implementing the recharging of an electrical battery (58), or user battery, using an AC line supply (61) and supplementary sources of electrical energy (59), characterized in that it comprises:
   a plurality of switching modules (122a, 122b, 122c, 13, 14), with a substantially identical structure, each switching module being associated with one of the available sources of electrical energy (61, 59) and producing, by chopping the voltage delivered by the source with which a DC voltage of given value is associated;
   a power DC bus comprising two electrical lines (23, 24), to which each of the various available sources of electrical energy is connected by means of the switching module which is associated with it, each switching module being composed of two electronic switches configured in series between the two lines (23, 24) of the power DC bus,
   a control circuit (22) which generates the chopping controls applied to the switches of the various switching modules (122a, 122b, 122c, 13, 14), the chopping control applied to a given switching module being defined by a control law which depends on the voltage and on the charge current (53) necessary for performing a recharging of the electrical battery in question (58) and on the maximum power (51) available from the AC line supply (61);
   an accommodation structure (31) configured for receiving the various switching modules and forming the power DC bus, said accommodation structure comprising a plurality of functionally identical locations onto which the various switching modules can be placed.

2. The device as claimed in claim 1, characterized in that the chopping controls generated by the control circuit are square-wave signals having a duty cycle which varies as a function of the value of the voltage (52) to be established on the power DC bus.

3. The device as claimed in claim 1, characterized in that, since the said AC line supply (61) is a three-phase supply, it comprises three switching modules (122a, 122b, 122c) each carrying out the rectification of the AC voltage delivered by one of the phases into a DC voltage; the mid-point of each of the three switching modules being connected to one phase of the AC supply (61) via a transformer (121).

4. The device as claimed in claim 1, characterized in that it comprises a switching module (13) configured for implementing the connection of an electrical energy storage battery (59), of given voltage, to the power DC bus, in such a manner that the storage battery (59) can be charged via the power DC bus or else discharged into the latter.

5. The device as claimed in claim 1, characterized in that it comprises a switching module (14) configured for making the connection of a user battery (58), of a given voltage, to the power DC bus, in such a manner that said user battery (58) can be charged up by the power DC bus with a given voltage and charging current, both characteristic of the battery used.

6. The device as claimed in claim 5, characterized in that the switching module (14) is furthermore configured in such a manner that said user battery (58) can be discharged onto the power DC bus so as to supply a top-up electrical energy over this bus.

7. The device as claimed in claim 1, characterized in that it comprises an accommodation structure (11) which houses a set of switching modules, with identical structures, mounted onto the accommodation structure (31) so as to form at least three stages for conversion of electrical energy (12, 13 and 14):
   a reversible AC-DC converter stage (12) comprising three switches (122a, 122b, 122c) respectively connected to each of the phases of the AC line supply via an isolation transformer (121),
   a first bidirectional DC-DC conversion stage (13), configured for implementing the recharging of an electrical storage battery (59);
   a second bidirectional DC-DC conversion stage (14), configured for implementing the recharging of the user battery (58) to be recharged;

the first DC-DC conversion stage (13) being furthermore configured in such a manner as to be able to inject current taken from the storage battery (59) onto the power DC bus.

8. The device as claimed in claim 1, characterized in that the control circuit (22) carries out the regulation (55) of the charging or discharge current of the storage battery (59), the regulation (54) of the charging current of the user battery (58) and also the regulation (56, 57) of the power consumed from the AC line supply (61), this regulation being carried out by measuring the charge currents of the storage battery (59) and of the user battery (58) and also the current consumed from the AC line supply (61) and by applying to each of the AC-DC or DC-DC conversion modules (122, 13, 14) a chopping signal whose duty cycle varies as a function of the current measurement carried out for the module in question.

9. The device as claimed in claim 8 characterized in that the chopping signal applied to each of the modules (122a, 122b, 122c, 13, 14) depends on setpoint values relating to the voltage and to the charging current of the user battery (58), to the value (52) of the voltage of the power DC bus (23, 24) and to the maximum power available (51) from the line supply.

10. The device as claimed in claim 1, characterized in that the accommodation structure (31) comprises a support (27) onto which the housings enclosing the various switching modules forming the device are mounted, the support (27) forming a heat dissipation element, as well as a conductor device forming the power DC bus, which connects in parallel the various switching modules mounted onto the accommodation structure (31), each of the links (23, 24) of the power DC bus being connected to each of the switching modules via a suitable connection means.

11. The device as claimed in claim 10, characterized in that, the switching modules being configured in such a manner that when they are mounted onto the accommodation structure (31) their connection points with the two links (23, 24) forming the power DC bus are aligned in two parallel rows, the power DC bus is composed of two conducting plates (23, 24) separated by an insulator (25), each plate having connection areas arranged so as to be disposed facing connection points in such a manner as to be able to be connected to the latter by suitable fixing means.

12. The device as claimed in claim 11, characterized in that the power DC bus consists of two layers of conducting material (23, 24) placed on the opposite faces of a plane layer of electrically insulating material (25) forming a sandwich structure.

13. The device as claimed in claim 2, characterized in that it comprises a switching module (13) configured for implementing the connection of an electrical energy storage battery (59), of given voltage, to the power DC bus, in such a manner that the storage battery (59) can be charged via the power DC bus or else discharged into the latter.

14. The device as claimed in claim 3, characterized in that it comprises a switching module (13) configured for implementing the connection of an electrical energy storage battery (59), of given voltage, to the power DC bus, in such a manner that the storage battery (59) can be charged via the power DC bus or else discharged into the latter.

* * * * *